United States Patent
Dinger et al.

(10) Patent No.: US 8,757,695 B2
(45) Date of Patent: Jun. 24, 2014

(54) FLAT FLOOR CARGO MANAGEMENT SYSTEM

(75) Inventors: Kevin D. Dinger, West Bloomfield, MI (US); Thomas E. Houck, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/425,804

(22) Filed: Mar. 21, 2012

(65) Prior Publication Data

US 2013/0249232 A1 Sep. 26, 2013

(51) Int. Cl.
*B60R 9/00* (2006.01)

(52) U.S. Cl.
USPC .......................................... 296/37.5

(58) Field of Classification Search
USPC ............... 296/37.5, 100.02, 100.04, 100.05, 296/100.06, 100.07, 100.09, 100.18, 24.43, 296/37.16, 37.6, 100.01, 100.1, 39.2; 160/368.1; 135/88.09; 224/543, 539, 224/542
See application file for complete search history.

(56) References Cited

U.S. PATENT DOCUMENTS

| | | | | |
|---|---|---|---|---|
| 5,716,091 A * | 2/1998 | Wieczorek | ................. | 296/37.16 |
| 5,782,522 A * | 7/1998 | DeBono | ................... | 296/100.18 |
| 5,857,729 A * | 1/1999 | Bogard | .................... | 296/100.09 |
| 5,947,358 A * | 9/1999 | Wieczorek | ................... | 224/543 |
| 6,027,155 A * | 2/2000 | Wisniewski et al. | ......... | 296/37.1 |
| 6,056,177 A * | 5/2000 | Schneider | ..................... | 224/401 |
| 6,447,045 B1 * | 9/2002 | Dickson et al. | .......... | 296/100.08 |
| 6,769,731 B1 * | 8/2004 | Myers et al. | ............. | 296/100.09 |
| 7,059,646 B1 * | 6/2006 | DeLong et al. | ............ | 296/24.43 |
| 7,083,218 B2 * | 8/2006 | Henderson | ............... | 296/100.06 |
| 7,201,421 B2 * | 4/2007 | Reynolds et al. | ............ | 296/37.5 |
| 7,216,916 B2 * | 5/2007 | Czerwinski et al. | ............ | 296/66 |
| 7,318,617 B1 * | 1/2008 | Scotton | ...................... | 296/37.16 |
| 7,537,264 B2 * | 5/2009 | Maimin et al. | ........... | 296/100.09 |
| 7,758,092 B2 * | 7/2010 | Kolpasky et al. | ............ | 296/37.5 |
| 8,061,758 B2 * | 11/2011 | Maimin et al. | ........... | 296/100.09 |
| 8,182,021 B2 * | 5/2012 | Maimin et al. | ........... | 296/100.09 |
| 8,328,264 B2 * | 12/2012 | Jackson et al. | ............ | 296/37.14 |
| 2001/0020631 A1 | 9/2001 | Spykerman et al. | | |
| 2007/0052257 A1 * | 3/2007 | Allen | ....................... | 296/100.09 |
| 2008/0116711 A1 * | 5/2008 | Thacker | ................... | 296/107.07 |
| 2010/0045069 A1 * | 2/2010 | Koba | ......................... | 296/180.1 |
| 2010/0127529 A1 * | 5/2010 | Elliott et al. | ............. | 296/100.09 |
| 2010/0140973 A1 * | 6/2010 | Duncan | .................... | 296/100.09 |
| 2011/0248523 A1 * | 10/2011 | Aebker et al. | .................. | 296/66 |
| 2012/0061985 A1 * | 3/2012 | Parker | .......................... | 296/37.8 |
| 2012/0205939 A1 * | 8/2012 | Maimin et al. | ........... | 296/100.07 |

FOREIGN PATENT DOCUMENTS

DE 19650767 A1 7/1998

* cited by examiner

*Primary Examiner* — Kiran B Patel
(74) *Attorney, Agent, or Firm* — Quinn Law Group, PLLC

(57) ABSTRACT

A cargo management system includes a base panel and a cover panel operatively attached to the base panel. The cover panel is pivotally movable between a first position and a second position. The first position of the cover panel is substantially parallel to the base panel, while the second position of the cover panel is substantially non-parallel to the base panel. A stowage area is defined between the base panel and the cover panel in the first position.

16 Claims, 5 Drawing Sheets

FLAT FLOOR CARGO MANAGEMENT SYSTEM

TECHNICAL FIELD

This disclosure relates to vehicle storage systems.

BACKGROUND

Automobiles and other vehicles may include cargo areas. The cargo areas are often, but not necessarily, in the rear of the vehicle. Cargo areas may be within, and accessible from, the passenger compartment, or may be within the trunk or boot of the vehicle. In some instances, the cargo area may be configured with removable seats.

SUMMARY

A cargo management system is provided. The cargo management system includes a base panel and a cover panel operatively attached to the base panel. The cover panel is pivotally movable between a first position and a second position. The first position of the cover panel is substantially parallel to the base panel, while the second position of the cover panel is substantially non-parallel to the base panel. A stowage area is defined between the base panel and the cover panel when the cover panel is in the first position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
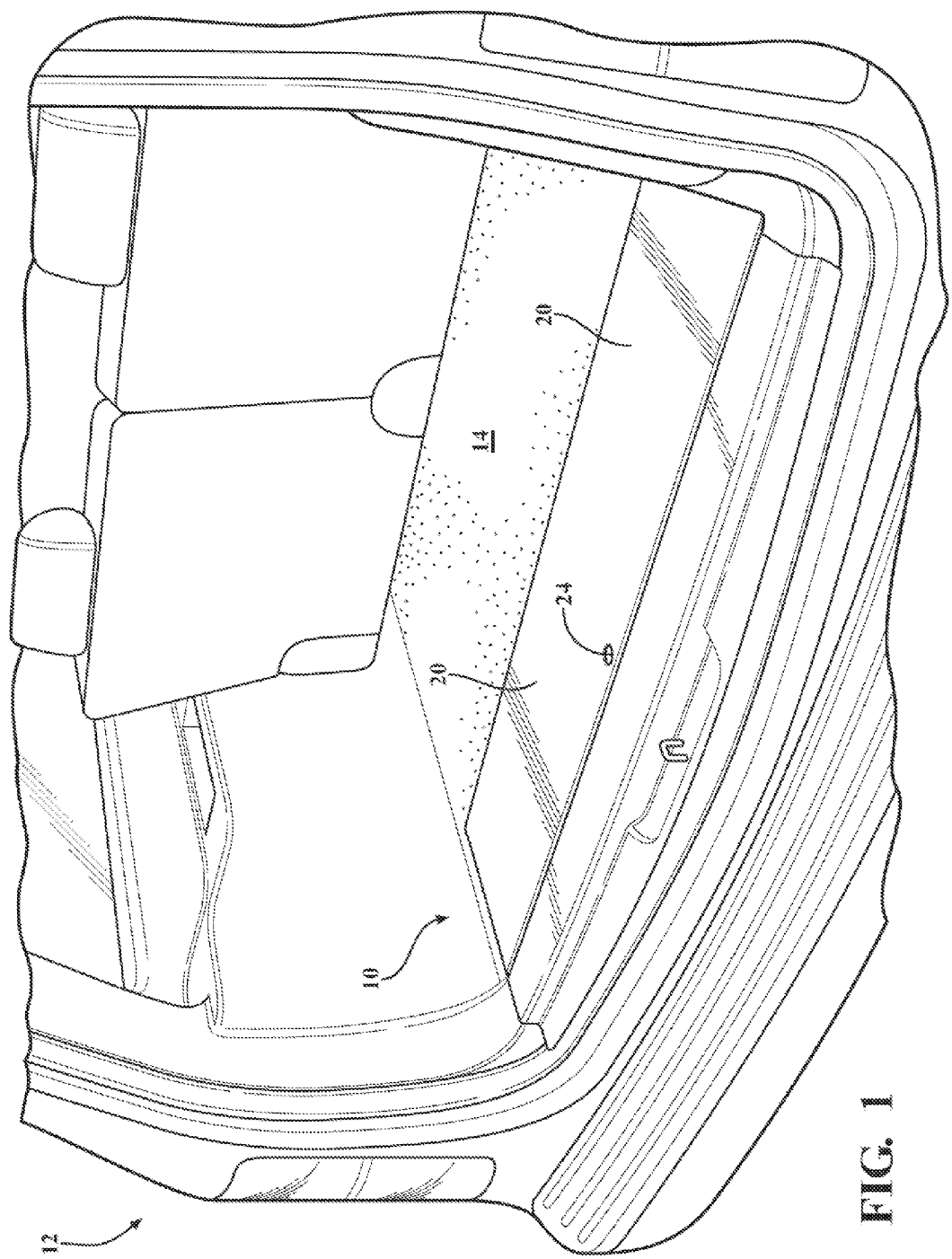
FIG. 1 is a schematic, isometric view of a storage system disposed within the rearward portion of a vehicle, and shown in a closed state.
Figure 2:
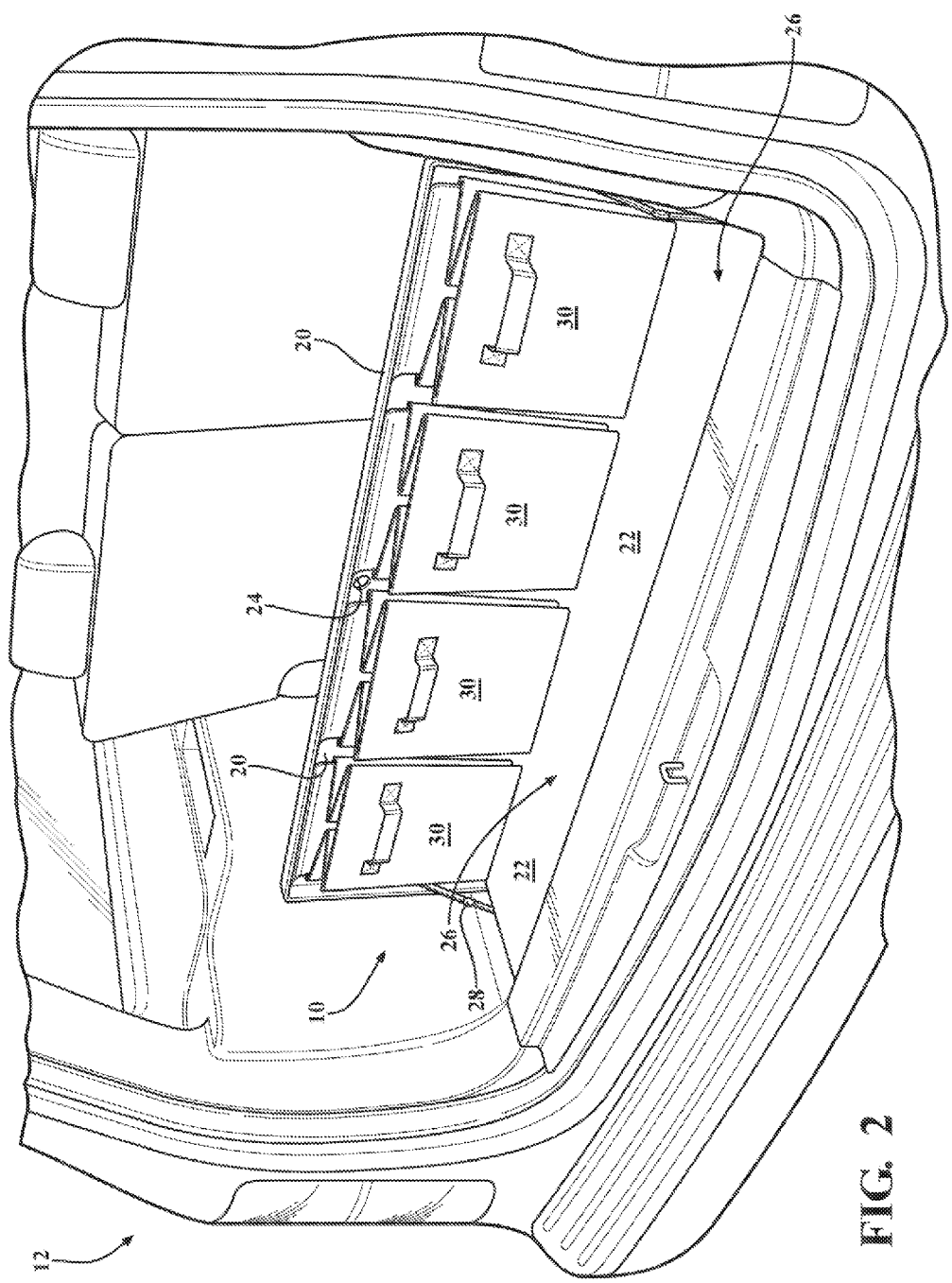
FIG. 2 is another schematic, isometric view of the storage system of FIG. 1, shown in an open state with partially deployed storage containers.
Figure 3:
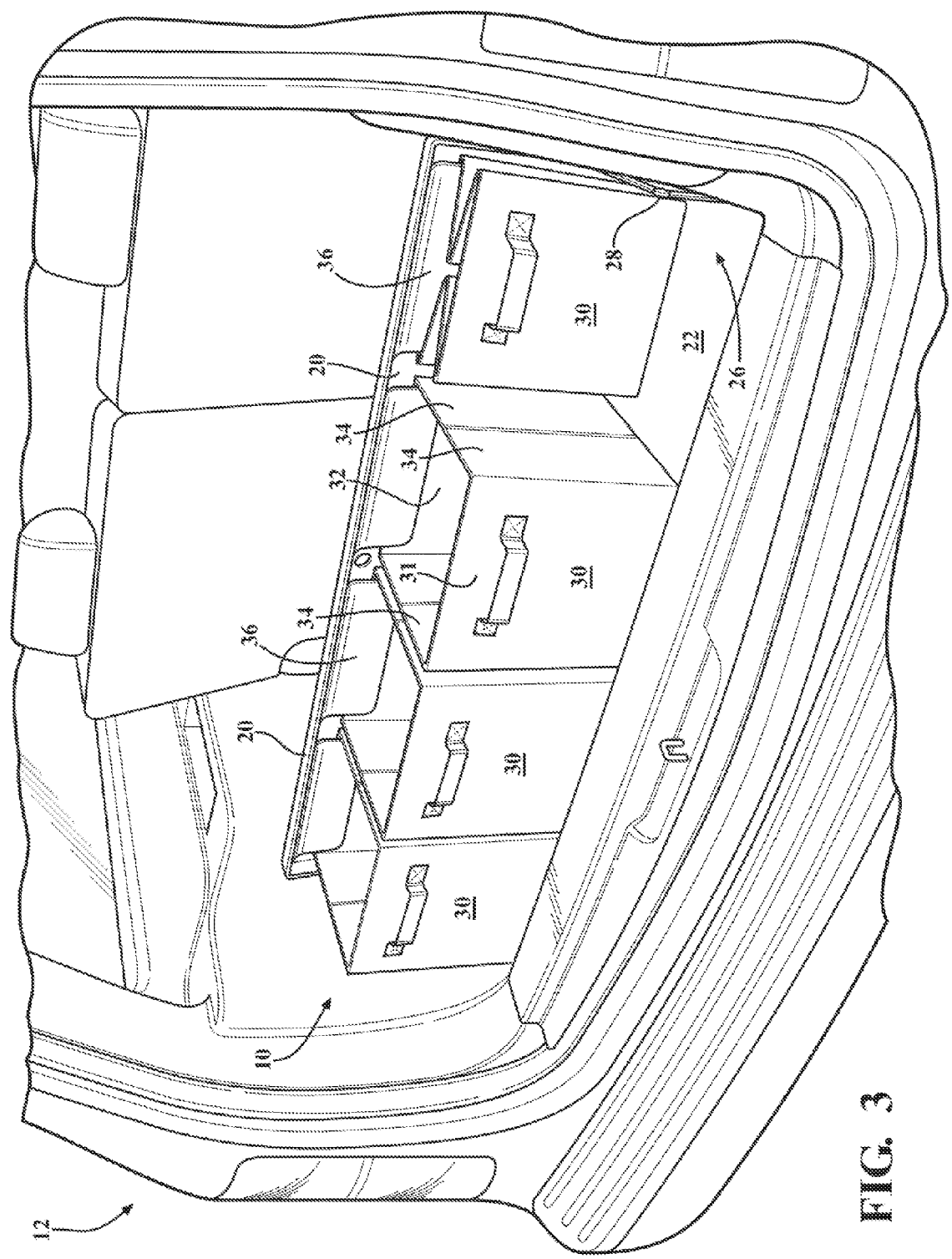
FIG. 3 is another schematic, isometric view of the storage system of FIGS. 1-2, shown in the open state with some fully deployed storage containers.

Referring to the drawings, wherein like reference numbers correspond to like or similar components wherever possible throughout the several figures, there is shown in FIG. 1, FIG. 2, and FIG. 3 a cargo management system or cargo system 10, which may be used in numerous vehicles, such as a rearward portion or cargo area of a vehicle 12 (only partially shown). FIG. 1 shows a schematic, isometric view of the cargo system 10 in a closed state. FIGS. 2 and 3 show the cargo system 10 in an open or deployed state. Features and components shown in other figures may be incorporated and used with those shown in FIGS. 1-3, and components may be mixed and matched between any of the configurations shown.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The vehicle 12 is shown for illustrative purposes and demonstrates only one possible environment into which the cargo system 10 may be incorporated. In this embodiment, the cargo system 10 is disposed at the rear of the vehicle 12 adjacent a load floor 14. In the closed state a cover panel 20 is substantially parallel and substantially coplanar with the load floor 14. Therefore, objects may be placed onto the load floor 14, which is substantially un-interrupted by the cargo system 10 when in the closed state, as shown in FIG. 1.

As shown in FIGS. 2 and 3, the cover panel 20 is operatively attached to a base panel 22. The cover panel is pivotally movable between a first position and a second position. The first position is substantially parallel to the base panel 22 and the second position is substantially non-parallel to the base panel 22. The first position, shown in FIG. 1, closes the cargo system 10, and the second position, shown in FIGS. 2 and 3, opens the cargo system 10.

The cover panel 20 shown in the figures is accessible and moveable from the first position to the second position via a handle 24 or pull feature. However, the handles 24 may not be required and other features may be used to access the cargo system 10.

A stowage area 26 is defined between the base panel 22 and the first position of the cover panel 20. The stowage area 26 covers a very large area but has a relatively low depth or height. The cargo system 10 may also include a locking mechanism 28 configured to restrict movement of the cover panel 20 from the second position to the first position, which prevents unwanted closing of the cover panel 20. The locking mechanism 28 may include a damper or restorer to slow movement or hold the cover panel 20 in any desired position. Additionally, the locking mechanism 28 may also be further configured to restrict movement of the cover panel 20 from the first position to the second position, which prevents unwanted opening of the cargo system 10.

The cargo system 10 includes a plurality of collapsible containers 30 operatively attached to the cover panel 20. The collapsible containers 30 are stowed within the stowage area 26 when the cover panel 20 is in the first position. The collapsible containers 30 shown are illustrative only, and many other types of container may be used with the cargo system 10.

The collapsible containers 30 may be deployed away from the stowage area 26 when the cover panel 20 is in the second position. None of the collapsible containers 30 are illustrated as deployed in FIG. 2, while several (three of the four included) of the collapsible containers 30 are shown deployed in FIG. 3.

When the collapsible containers 30 are deployed, they may be filled with cargo, such as, for example: groceries, shopping bags, or sporting equipment. When the collapsible containers 30 are not deployed and the cover panel 20 is in the second position, the collapsible containers 30 are out of way and may allow, for example, boxes or larger items to be placed or rested on the base panel 22.

As shown in FIGS. 2-3, the cargo system 10 is configured such that the second position of the cover panel 20 is substantially perpendicular with the base panel 22. As shown in FIG. 1, the first position of the cover panel 20 is substantially co-planar with the load floor 14, such that the load floor 14 and the cover panel 20 form a substantially-flat surface.

The illustrative type of collapsible containers 30 shown in FIGS. 1-3 are folding boxes. The collapsible containers 30 include a first wall 31 and a second wall 32, which is substantially parallel to the first wall 31. A pair of folding walls 34 connect the first wall 31 to the second wall 32. Collapsing or folding the folding wall 34 takes the collapsible container 30 from an open position, in which the first wall 31 is extended away from the second wall 32, to a closed position, in which the first wall 31 is proximate to the second wall 32. Alternatively, flexible fabric or an elastic material may be placed between the first wall 31 and the second wall 32 to allow the collapsible containers 30 to be stowed while the cover panel 20 is in the first position and deployed while the cover panel 20 is in the second position.

The cargo system 10 shown in FIGS. 1-3 includes one or more clip features 36 operatively attached to the cover panel 20. The clip feature 36 is configured to mate the collapsible container 30 to the cover panel 20. In this example, there are four clip features 36 supporting four collapsible containers 30. The clip features 36 also allow or facilitate selective removal of the collapsible containers 30 from the cover panel 20 and the cargo system 10. The cargo system 10 is shown with highly illustrative clip features 36. Other configurations may include, for example, clip features 36 formed as spring-loaded fingers, arms, or panels.

If the cargo system 10 is configured without the clip features 36, the collapsible containers 30 may be attached, adhered, or sewn directly to the cover panel 20. Alternatively, fasteners may be used to mate the collapsible containers 30 to the cover panel 20. For example, snaps and hook-and-loop strips may be used to hold the collapsible containers 30 to the cover panel 20 while still maintaining the ability to remove the collapsible containers 30 or to switch the collapsible containers 30 for other cargo bins, baskets, or retainers.

Figure 4:
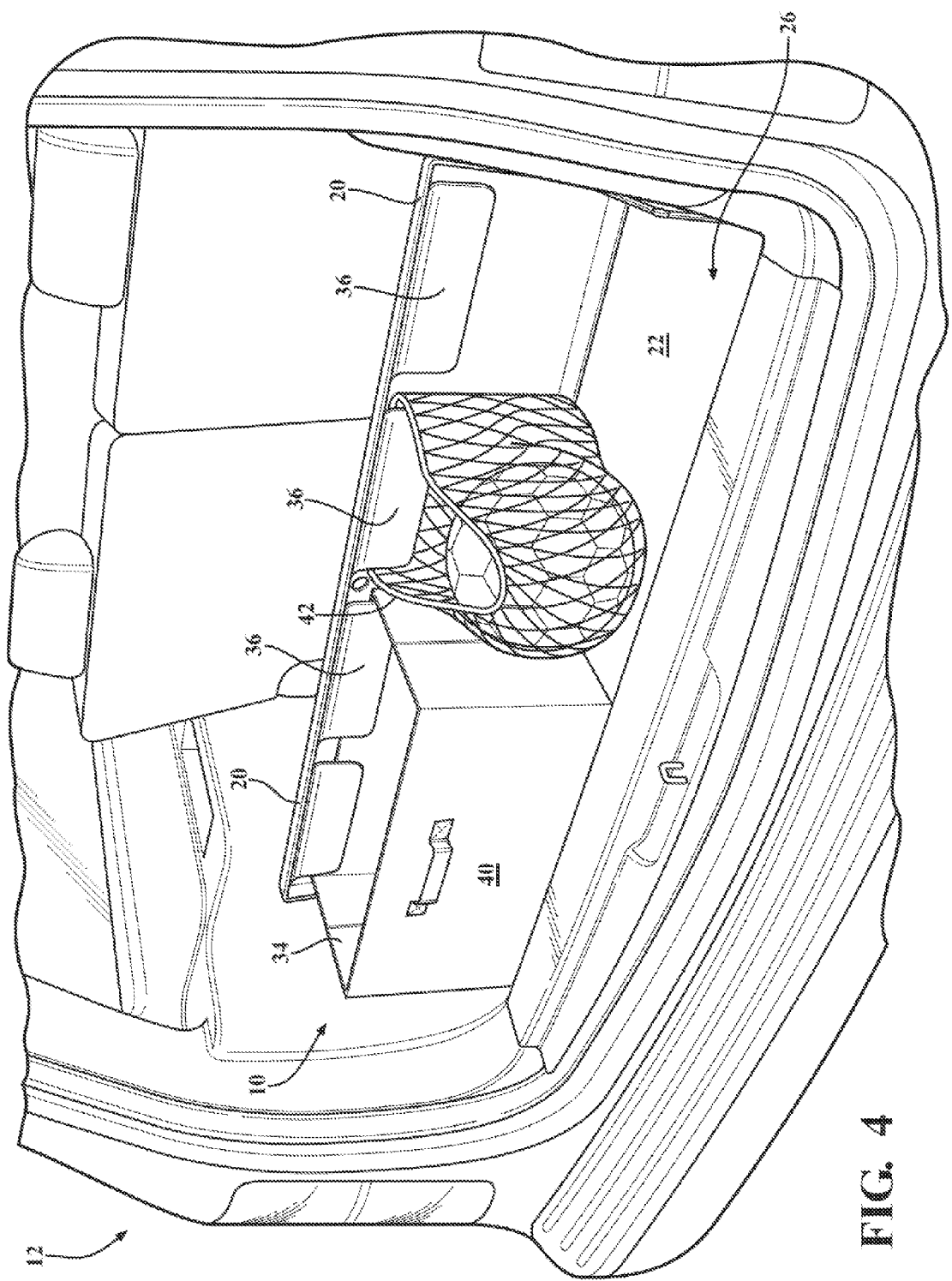
FIG. 4 is another schematic, isometric view of the storage system of FIGS. 1-3, shown with a different configuration of storage containers.

Referring also to FIG. 4, and with continued reference to FIGS. 1-3, there is shown another schematic view of the cargo system 10. In FIG. 4, the cargo system 10 is alternatively configured to allow more flexibility in cargo stowage.

The four collapsible containers 30 shown in FIGS. 2-3 have been removed. Instead, a double bin 40 has been placed on the left (as viewed in the figure) in roughly the same space as was previously shown occupied by two of the collapsible containers 30.

The double bin 40 is mated to two of the clip features 36, and may be referred to as taking up two of the four slots of the cargo system 10. However, note smaller bins may also be used and more than four containers or bins may be used with the cargo system 10.

On the right (as viewed in the figures) of the cargo system 10, there is a mesh bag 42 attached to one of the clip features 36. One of the cargo slots has had the collapsible container 30 removed and has been left empty. Note also that straps, belts, or hooks may also be used with the cargo system 10 to retain cargo items to the cover panel 20 or the base panel 22.

Figure 5:
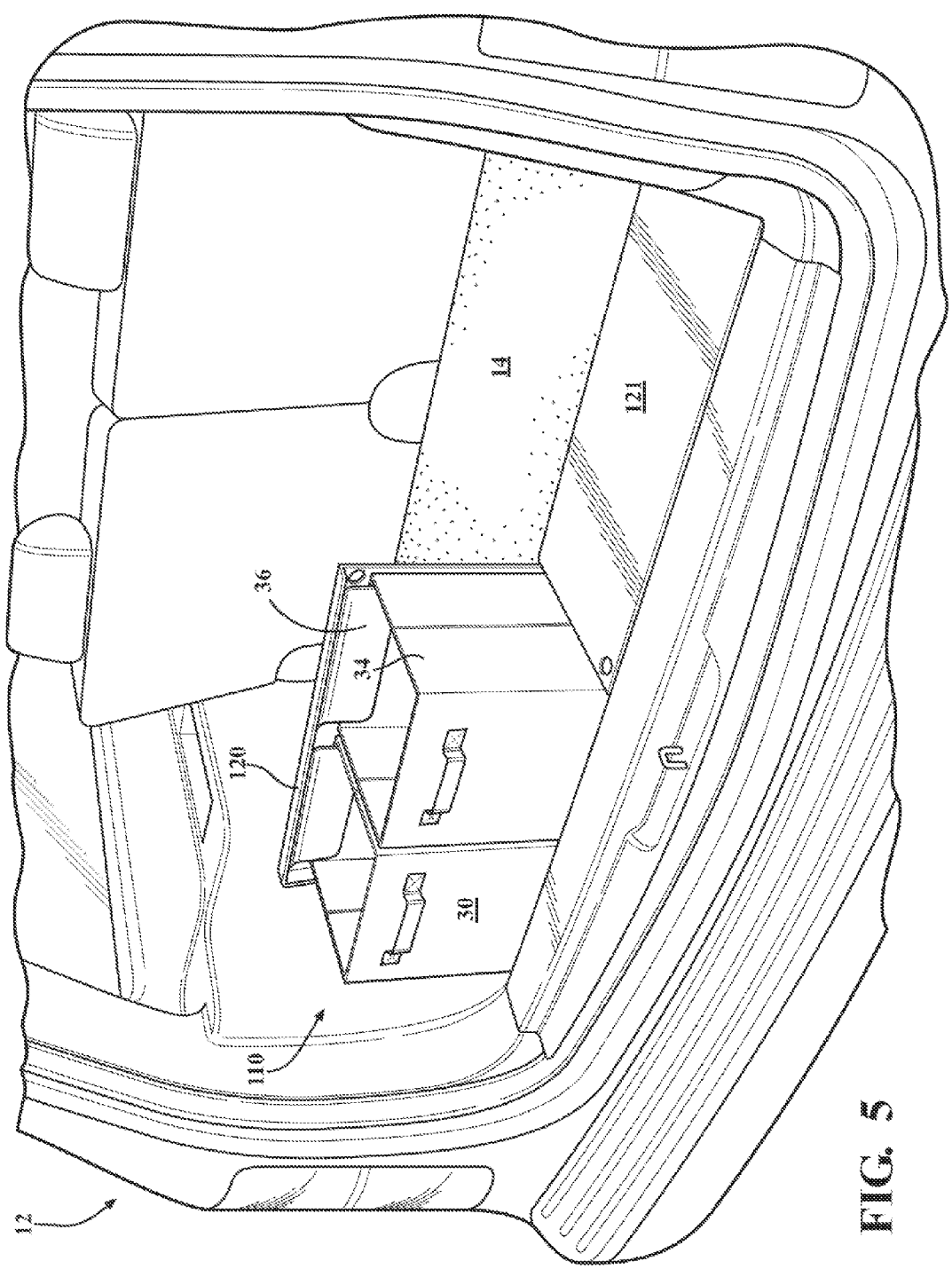
FIG. 5 is a schematic, isometric view of another storage system, shown in a partially-open and partially-closed state.

Referring now to FIG. 5, and with continued reference to FIGS. 1-4, there is shown a schematic, isometric view of another storage system or cargo system 110. The cargo system 110 is again illustratively shown within the vehicle 12, and is shown in a partially-open state.

The cargo system 110 includes a first cover panel 120, which is selectively pivotable between a first position and a second position. The cargo system 110 also includes a second cover panel 121, which is independently pivotable between a first position and second position, irrespective of the position of the first cover panel 120.

In the state shown in FIG. 5, the first cover panel 120 is shown in its second, or open, position; and the second cover panel 121 is shown in its first, or closed, position. The first cover panel 120 has two of the collapsible containers 30 attached, both of which are deployed or open for holding cargo. The second cover panel 121 may be configured with the same or different cargo retention components, such as: containers, bins, bags, straps, hooks, or clasps.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A cargo management system, comprising:
   a base panel;
   a cover panel operatively attached to the base panel and pivotally movable between a first position and a second position, wherein the first position is substantially parallel to the base panel and the second position is substantially non-parallel to the base panel;
   a stowage area defined between the base panel and the first position of the cover panel; and
   a collapsible container operatively attached to the cover panel, such that the collapsible container is stowed in the first position and is deployed in the second position.

2. The cargo management system of claim 1, further comprising:
   a locking mechanism configured to restrict movement of the cover panel from the second position to the first position.

3. The cargo management system of claim 2, wherein the second position of the cover panel is substantially perpendicular with the base panel.

4. The cargo management system of claim 3, wherein the cargo management system cooperates with a load floor, and wherein the first position of the cover panel is substantially co-planar with the load floor.

5. The cargo management system of claim 4, wherein the collapsible container further includes:
   a first wall;
   a second wall; and
   a folding wall connecting the first wall to the second wall, such that folding the folding wall takes the collapsible container from an open position, in which the first wall is extended away from the second wall, to a closed position, in which the first wall is proximate to the second wall.

6. The cargo management system of claim 5, further comprising:
   a clip feature operatively attached to the cover panel and configured to selectively attach the collapsible container to the cover panel, such that the collapsible container is selectively removable from the cover panel.

7. The cargo management system of claim 6, wherein the locking mechanism is further configured to restrict movement of the cover panel from the first position to the second position.

8. The cargo management system of claim 7, wherein the cover panel is a first cover panel and further comprising:
   a second cover panel, pivotally movable between a first position and a second position, wherein the second cover panel is configured to pivot independently from the first cover panel.

9. A cargo management system, comprising:
   a base panel;

a cover panel operatively attached to the base panel and pivotally movable between a first position and a second position, wherein the first position is substantially parallel to the base panel and the second position is substantially perpendicular to the base panel; and a stowage area defined between the base panel and the first position of the cover panel.

10. The cargo management system of claim 9, further comprising:

a collapsible container operatively attached to the cover panel, such that the collapsible container is stowed in the first position and is deployed in the second position.

11. The cargo management system of claim 10, further comprising:

a clip feature operatively attached to the cover panel and configured to selectively attach the collapsible container to the cover panel, such that the collapsible container is selectively removable from the cover panel.

12. The cargo management system of claim 11, further comprising:

a locking mechanism configured to restrict movement of the cover panel from the second position to the first position.

13. The cargo management system of claim 12, wherein the cover panel is a first cover panel and further comprising:

a second cover panel, pivotally movable between a first position and a second position, wherein the second cover panel is configured to pivot independently from the first cover panel.

14. A cargo management system, comprising:

a base panel;

a cover panel operatively attached to the base panel and pivotally movable between a first position and a second position, wherein the first position is substantially parallel to the base panel and the second position is substantially non-parallel to the base panel;

a stowage area defined between the base panel and the first position of the cover panel;

a collapsible container operatively attached to the cover panel, such that the collapsible container is stowed in the stowage area when the cover panel is in the first position;

a clip feature operatively attached to the cover panel and configured to selectively attach the collapsible container to the cover panel, such that the collapsible container is selectively removable from the cover panel; and a locking mechanism configured to restrict movement of the cover panel from the second position to the first position.

15. The cargo management system of claim 14, wherein the cover panel is a first cover panel and further comprising:

a second cover panel, pivotally movable between a first position and a second position, wherein the second cover panel is configured to pivot independently from the first cover panel.

16. The cargo management system of claim 15, wherein the collapsible container further includes:

a first wall;

a second wall; and a folding wall connecting the first wall to the second wall, such that folding the folding wall takes the collapsible container from an open position, in which the first wall is extended away from the second wall, to a closed position, in which the first wall is proximate to the second wall.

* * * * *